(No Model.)
W. W. STICKNEY.
MACHINE FOR CUTTING AND FITTING BRANCHES OF PIPE JUNCTIONS OF CLAY, &c.
No. 268,837. Patented Dec. 12, 1882.
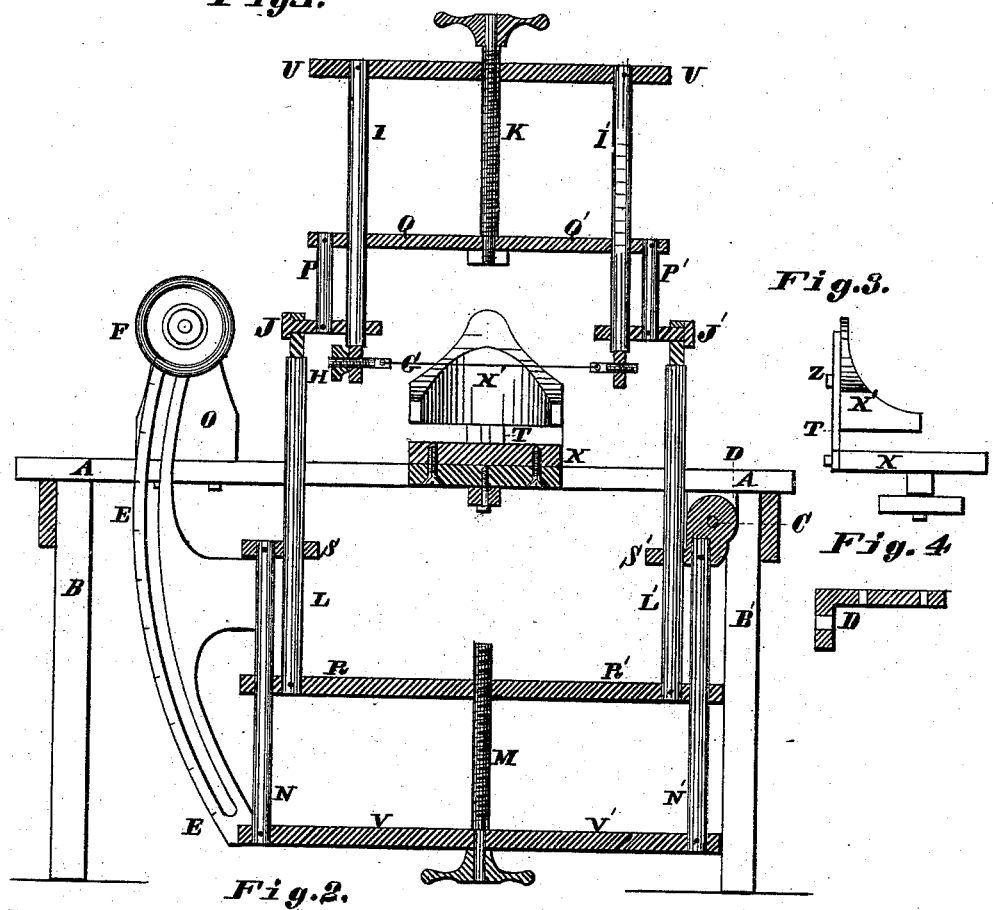
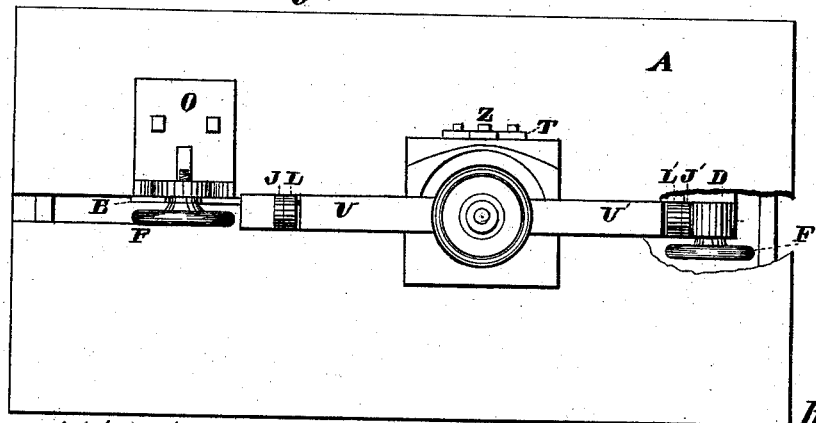
Attest:
W. B. Stewart
Harry W. Summer
Inventor:
William Wier Stickney

UNITED STATES PATENT OFFICE.

WILLIAM W. STICKNEY, OF ST. LOUIS, MISSOURI.

MACHINE FOR CUTTING AND FITTING BRANCHES OF PIPE JUNCTIONS OF CLAY, &c.

SPECIFICATION forming part of Letters Patent No. 268,837, dated December 12, 1882.

Application filed April 4, 1882. (No model.)

*To all whom it may concern:*

Be it known that I, WILLIAM WIER STICKNEY, a citizen of the United States, residing at St. Louis, in the State of Missouri, have invented a new and useful Machine for Cutting and Fitting Branches of Pipe Junctions of Clay or other Plastic Material, of which the following is a specification.

The object of my invention is to enable any common laborer of ordinary intelligence to cut and fit by a single stroke any T or Y branch of sewer-pipe or drain-tile while in the plastic condition, so as to fit accurately any required size of main at any required angle. I attain this object by the mechanism illustrated by the accompanying drawings, in which—

Figure 1 is a vertical section of the entire machine and frame-work or table which supports it. Fig. 2 is a top view of the machine, standing perpendicular to the top surface of the table with a small piece of the top board removed to show the point and method of attachment of the machine to the table underneath. Fig. 3 is a side view of the carriage which supports the pipe and holds it in position while being cut. Fig. 4 is a vertical section through the center of the bracket or hanger attached to the under side of the table, and in which the machine is hung.

Similar letters refer to similar parts throughout the several views.

The table or bench A A, with its legs or standards B B, constitutes the frame-work in which the machine is hung on the fixed axis C, projecting from the bracket D. The machine turns freely on this axis when unclamped.

N V V N' is a frame rigidly fixed to the journal S' of the axis C.

E E is a graduated arc, rigidly fixed to the frame N V V N' to guide the operator in adjusting the machine to the required angle.

F F' are set-screws to hold the machine firmly in position when adjusted.

O is the bracket in which the set-screw F works, and F' works in the end of the axis C.

G is the cutting-wire, and H is a thumb-screw for maintaining the necessary tension of the cutting-wire G.

I U U I' is the adjustable frame, holding the cutting-wire G.

P Q Q P' is a frame rigidly fixed to the axes J J', on which it revolves, carrying with it the frame I U U I'.

K is a screw attached by its lower end to the cross-bar Q Q, and the thread or nut in which the screw works is in the cross-bar U U, so that when the screw turns the entire frame I U U I', carrying the cutting-wire G, moves easily up or down through the guide-holes in the cross-bar Q Q and the inner ends of the axes J J', thus adjusting the cutting-wire so as to describe any required degree of curvature when the frames I U U I' and P Q Q P' revolve on their common axes J J', and the leg l is so graduated as to guide the operator in making such adjustment.

X is the board on which the pipe stands on end while being cut; and X' is the adjustable support to prevent the pipe from moving while being cut, and should be hollowed out to fit the exterior of the pipe, a different concavity being required for each size of pipe to be cut. This support X' slides up or down on the slotted stud T, according to the required length of the branch to be cut, and is held in position by the set-screw Z.

It is generally desirable to maintain the cutting-wire G at a nearly uniform height above the table for all sizes of pipe. This is accomplished by means of the movable frame L R R L', carrying the axes J J', and adjusted by the screw M, which is attached to the bottom cross-bar V V, and works in a thread or nut in the cross-bar R R, thus enabling the operator to move the frame L R R L', with all it carries, up or down, as may be required, through the guide-holes in the ends of the cross-bar R R and the inner ends of S and S'.

The legs I I', L L', and N N' of the three principal frames should all be finished up smooth, so as to work easily through their respective guide-holes, and should all be rigidly fixed to their respective cross-bars U U, R R, and V V.

In order to make the adjustment and action of this machine more clear, suppose, for example, it is required to cut and fit a right-angular or T branch to a twelve-inch main: First loosen the set-screws F and F' and adjust for the required angle by swinging the machine on the axis C till the index on the bracket O marks ninety degrees on the graduated arc E E, and then tighten the set-screws F F'. Then by means of the screw M elevate or depress the frame L R R L', according to the required length of the branch to be cut. Then turn the screw K till the notch marked 12 in the graduated scale on the leg I' coincides with the top of the cross-bar Q Q. Now place the pipe to be cut on the board X on end, so that the axis of the pipe and the axes J J' shall be in the same vertical plane, and adjust the support X' to the back side of the pipe by means of the slotted stud T and the set-screw Z, so that the pipe will have a firm bearing in the rear to prevent any displacement by the force of the cutting-wire G as it passes through the pipe from the opposite or front side. When all is thus adjusted swing the cutting-wire G quite through the body of the pipe from front to rear by turning the frames P Q Q P', I U U I' together on their common axes J J', thereby making a clean-cut branch, which must necessarily fit accurately the twelve-inch main, because the cutting-wire G in passing through the pipe described the exact curvature of the circumference of a twelve-inch pipe. For cutting and fitting branches of any other angle than a right angle, loosen the set-screws F F' and swing the machine on the axis until the index on the bracket O indicates the degree of the required angle on the arc E E, then tighten the set-screws F F', and proceed as already described.

What I claim as my invention, and desire to secure by Letters Patent, is—

1. The combination of a cutting-wire, G, with a screw, K, and two frames, I U U I', P Q Q P', revolving on common axes J J', to produce an annular or cylindrical motion of the wire of any required radius, substantially as herein set forth.

2. The combination of the axis C with its journal S' and the frames N V V N', L R R L', P Q Q P', I U U I', the axes J J', the screws K and M, the cutting-wire G, and the thumb-screw H and the graduated arc E E, to facilitate the adjustment of the cutting-wire G to any required angle, substantially as herein set forth.

3. The combination of a screw, M, with the frames N V V N', L R R L', the axes J J', the frames P Q Q P', I U U I', the cutting-wire G, and the thumb-screw H to facilitate the adjustment of the cutting-wire G to any required height above the table A A, substantially as herein set forth.

WILLIAM WIER STICKNEY.

Witnesses:
C. R. GREENE,
E. GRAY.